US008612928B2

(12) United States Patent
Agsen et al.

(10) Patent No.: US 8,612,928 B2
(45) Date of Patent: Dec. 17, 2013

(54) GENERATING EXCEPTION-BASED COMPONENT MODELS FROM NON-EXCEPTION-BASED MODELS

(75) Inventors: Mohsen M. Agsen, Honolulu, HI (US); Craig J. Symonds, Woodinville, WA (US); Jean-Pierre Duplessis, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 12/755,421

(22) Filed: Apr. 7, 2010

(65) Prior Publication Data

US 2011/0252396 A1    Oct. 13, 2011

(51) Int. Cl.
*G06F 9/45* (2006.01)

(52) U.S. Cl.
USPC ......................................... 717/104

(58) Field of Classification Search
USPC ......................................... 717/104
See application file for complete search history.

(56) References Cited

U.S. PATENT DOCUMENTS 6,154,680 A * 11/2000 White et al. ............... 700/19
6,247,169 B1 * 6/2001 DeLong ..................... 717/131
6,941,558 B2    9/2005 Hill et al.
7,617,479 B2   11/2009 Hambrick et al.
2004/0268330 A1  12/2004 Grover et al.
2008/0256509 A1  10/2008 Mazzeranghi

OTHER PUBLICATIONS

Lele Vishwas., "Generate Custom Managed C++ Wrappers for Easier COM Interoperation Using DCOMSuds", Retrieved at<<http://msdn.microsoft.com/en-us/magazine/cc188746.aspx>>,Aug. 2003, pp. 8.

* cited by examiner

*Primary Examiner* — John Chavis
(74) *Attorney, Agent, or Firm* — Jared S. Goff (57) ABSTRACT

Exception-based component models can be generated from non-exception-based models. For example, a non-exception-based interface contract (such as a non-exception-based interface contract in a header file) for a consumable software component can be parsed. Additionally, a wrapper for the consumable software component can be generated from the non-exception-based interface contract. The wrapper can have an exception-based interface contract implementation, and the exception-based interface contract implementation can be a mirror equivalent of the non-exception-based interface contract. If the non-exception-based interface contract hints at one or more arguments as being out argument(s) for a function in the consumable software component, then predefined heuristics can be used to select one of those argument(s) to be used by the exception-based interface contract implementation as a return value for the function.

20 Claims, 5 Drawing Sheets

GENERATING EXCEPTION-BASED COMPONENT MODELS FROM NON-EXCEPTION-BASED MODELS

BACKGROUND

When developing software applications, developers often write the code for an application to consume one or more pre-existing software components. For example, a software component may be been written previously, and that software component may have an interface contract that the software component will adhere to when the software component is invoked. For example, an interface contract may hint at input arguments, out arguments, and/or return values for one or more functions in the software component.

Many such interface contracts and software components are implemented as non-exception-based models, which typically return an error code (e.g. an HRESULT value). The error code can indicate whether the function succeeded or failed, and may also indicate other information, such as additional information about the nature of a failure if one occurs. Code can be written for the application to inspect the error code from such a component and to deal with failures if they occur. Other software components are implemented in exception-based models, which typically throw an exception if a failure occurs. For such exception-based models, exception handling functions can be invoked to handle the thrown exceptions and deal with corresponding failures. When consuming non-exception-based models, consuming applications typically invoke non-exception techniques, such as inspecting returned error codes to detect failures. Similarly, when consuming exception-based models, exception-based techniques such as exception handling functions are typically invoked.

SUMMARY

When consuming software components, consuming applications have typically consumed the software components according to the error handling model that was chosen by the software component author. Accordingly, when consuming non-exception based software components, consuming applications have invoked non-exception-based techniques to deal with those software components, even if exception-based techniques would be preferred. For example, in many situations, less code may be used to consume an exception-based software component than to consume a similar non-exception-based software component. The embodiments described herein deal with converting non-exception-based software component models to exception-based software component models, so that the software components can be consumed using exception-based techniques, even if the components were authored as non-exception-based component models. A consuming application may choose to invoke a software component by consuming the original non-exception-based model or the converted exception-based model.

In one embodiment, the tools and techniques can include parsing a non-exception-based interface contract for a consumable software component. Additionally, a wrapper (e.g., a class wrapper) for the consumable software component can be generated from the non-exception-based interface contract. The wrapper can have an exception-based interface contract implementation, and the exception-based interface contract implementation can be a mirror equivalent of the non-exception-based interface contract. As used herein, an exception-based interface contract implementation being a mirror equivalent of a non-exception-based interface contract refers to (1) the exception-based interface contract implementation having a one-to-one correspondence between information for methods or functions in the exception-based interface contract implementation and the information for corresponding methods or functions in the non-exception-based interface contract, and (2) the exception-based interface contract implementation and the non-exception-based interface contract interacting with the methods or functions at the same level (e.g., both interacting directly with the functions or methods).

In another embodiment of the tools and techniques, a non-exception-based interface contract for a consumable software component is parsed, and an exception-based model for the consumable software component is generated from the non-exception-based interface contract. If the non-exception-based interface contract hints at one or more arguments being out arguments for a function in the consumable software component, then generating can include generating, in the exception-based model, code for returning an one of the one or more arguments (i.e., one of the arguments that was hinted at as being an out argument) from the function. An out argument is an argument that is passed to a function and filled out by the function. Contracts can hint at arguments as being out arguments in various different ways, which often differ between programming languages. For example, a contract can hint at an out argument using the keyword "ref" in C#, by including "**" following the argument type in C++, etc.

In yet another embodiment of the tools and techniques, a non-exception-based interface contract for a consumable software component can be parsed. It can be determined whether the non-exception-based interface contract hints at one or more arguments as being one or more out arguments for a function in the consumable software component. An exception-based model for the consumable software component can be generated from the non-exception-based interface contract. If the non-exception-based interface contract includes code hints at one or more out arguments, then generating the exception-based model can comprise including, in the exception-based model, code for returning one of the one or more arguments from the function. The non-exception-based interface contract and the exception-based model can be made available for consumption by a consuming application.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved techniques related to consumption of software components. Such improvements may result from the use of various techniques and tools separately or in combination.

Such techniques and tools may include parsing a non-exception based interface contract for a consumable software component. An exception-based model can be generated from the non-exception-based interface contract. For example, the exception-based model may include a wrapper for the software component, and the wrapper can have an exception-based interface contract implementation. The exception-based interface contract implementation can be a mirror equivalent of the non-exception-based interface contract. Additionally, if the non-exception-based interface contract hints at one or more out arguments for a function in the consumable software component, then the exception-based model can include code for returning one of those argument(s) from the function.

Accordingly, the pre-existing non-exception-based software component can be consumed using exception-based techniques by consuming the exception-based model in the source code for a consuming application. For example, this may include consuming the exception-based wrapper source code in the source code for the consuming application, and invoking that exception-based wrapper to invoke a function in the consumable software component. As will be discussed more below, this may significantly reduce the amount of source code that is written to invoke consumable software components, as compared to using non-exception-based techniques. In addition, a consuming application may still choose to invoke the software component using the original non-exception-based interface contract, and can do so using standard non-exception-based coding techniques (e.g., inspecting returned error codes, etc.).

In some prior implementations, consumable components have been written in such a way that they can be used in exception-based and non-exception-based consuming applications. For example, the authors of such components may have authored an Interface Definition Language (IDL) file that is configured to be processed to produce exception-based models as well as non-exception-based models that include non-exception-based contracts. However, many consumable components were not intended to be used in exception-based models, and they do not have such dual-purpose IDL files. Instead they are single-purpose non-exception-based consumable components with non-exception-based interface contracts that were authored along with the consumable components. The tools and techniques described herein can utilize such components even though they were not intended to be used in exception-based models. Specifically, the tools and techniques can generate an exception-based model from a non-exception-based interface contract, such as an interface contract in a header file (commonly implemented as a .h file).

Accordingly, one or more substantial benefits can be realized from the tools and techniques described herein. However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

Figure 1:
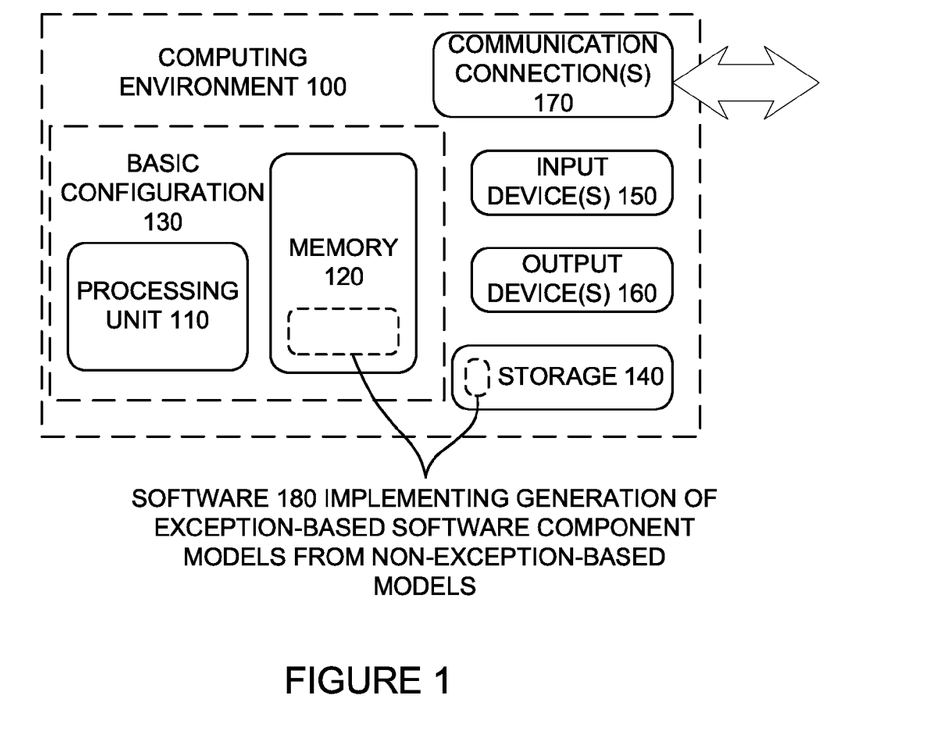
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a computing environment for converting non-exception-based software component models to exception-based software component models. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing generation of exception-based software component models from non-exception-based models.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include non-transitory computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include functions, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

Figure 2:
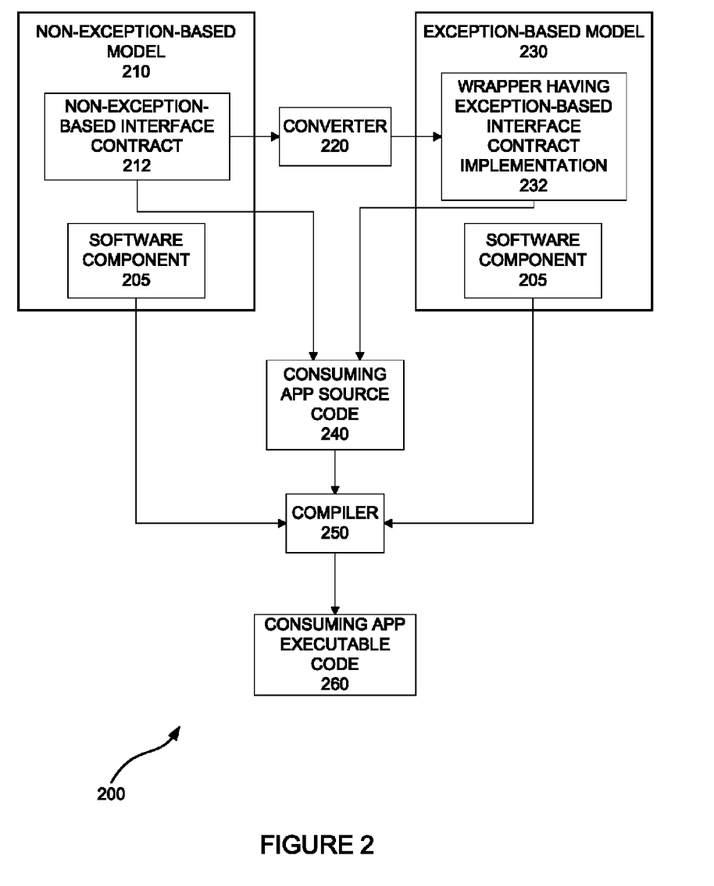
FIG. 2 is a block diagram of an exception-based component model generation and consumption environment.

II. Exception-Based Component Model Generation and Consumption System and Environment FIG. 2 is a block diagram of an exception-based component model generation and consumption computing environment (200) in conjunction with which one or more of the described embodiments may be implemented. The environment (200) can include a consumable software component (205). For example, the software component (205) may be in the form of source code and/or object code. The producer of such a software component (205) will typically also produce an interface contract for the software component, such as a non-exception-based interface contract (212). Such an interface contract (212) typically includes code for returning an error code, which can indicate that running the software component (205) was completed successfully, or that running the software component (205) resulted in an error, or failed.

One example of such an error code is the HRESULT code commonly used in Microsoft technologies. The HRESULT code can be inspected to determine whether the function succeeded or failed, and it may also be inspected to reveal information about errors, if there are errors. For example, the HRESULT may be tested using standard C++ FAILED and SUCCEEDED macros. Typically, an HRESULT value of 0 or 1 indicates successful completion, and a negative number indicates failure, and may also indicate some additional information about the failure.

The environment (200) can also include a converter (220), which can generate an exception-based model (230) from the non-exception-based model (210). The exception-based model (230) can also include the software component (205) (indeed, the converter (220) may not even have access to the software component (205) itself), but instead of the non-exception-based interface contract (212), the exception-based model can include a wrapper (232) having an exception-based interface contract implementation. The exception-based interface contract implementation can be a mirror image of the non-exception-based interface contract (212). Accordingly, the wrapper (232) can interface directly with the software component and its methods.

If the non-exception-based interface contract (212) defines an out argument for a function in the software component (205), the wrapper (232) can be configured to return the out argument as a return value for that function. If the non-exception-based interface contract (212) defines multiple out arguments for a function, then the wrapper (232) can be configured to return a selected out argument, and to pass the remaining out arguments according to normal out argument techniques. The converter (220) can invoke one or more of various different techniques to select which out argument to return. For example, the converter (220) may select an out argument to be returned if a particular significance "hint" is provided for that out argument (e.g. an indication of "default" adjacent to the out argument in the non-exception-based interface contract). If no significance hint is recognized by the converter (220), the converter (220) may use some other technique to select an out argument to return, such as returning the last out argument listed for the function in the non-exception-based interface contract (212). The techniques or heuristics used by the converter (220) to select one of multiple out arguments to be returned may be modified in response to user input. For example, user input may indicate that an out argument should be returned if the name for the argument has a particular pattern (particular sequence of characters in the argument name, the longest argument name, etc.), or use input may indicate that a particular out argument in the order of out arguments (the first, second, third, last, etc.) is to be returned. If the non-exception-based interface contract (212) does not list any out arguments for a function, then the wrapper can have a VOID return type for the method, and have the method not return a value.

The converter (220) may generate the exception-based model (230) while a consuming application is being developed. Referring still to FIG. 2, a consuming application may consume either the original non-exception-based model (210), or the generated exception-based model (230). For example, while developing a software application, the converter (220) may receive a request to generate the exception-based model (230). For example, this may be done in response to user input from a software developer of a consuming application. In response to such a request, the converter (220) can parse the non-exception-based interface contract (212) and generate the exception-based model (230) from it. The parsing and generation may be done automatically by the converter (220). This generation may include generating the wrapper (232) without manipulating or even accessing the software component (205) itself. Indeed, the software component (205) may be in the form of object code that the converter (220) may be unable to parse and understand. A software developer may provide user input to choose the non-exception-based model (210) for consumption in a consuming application (e.g., by writing code to invoke the software component (205) with the non-exception-based model (210)). Alternatively, the software developer may provide user input to choose the exception-based model (230) (e.g., by writing code to invoke the software component (205) with the exception-based model (230)).

The developer may invoke the exception-based model (230) for the software component (205) using standard exception-based techniques, such as techniques similar to the example that will be discussed below. This may save a substantial amount of time and resources. For example, it may allow a developer to invoke a software component with a single line of code, when it would have taken several lines of code to invoke the software component with the non-exception-based model. Invoking the exception-based model (230) may also be less complex, so that less experienced developers may be able to invoke consumable software components when developing consuming applications.

As an example, if a developer of a consuming software application chooses to consume the exception-based model (230), then the wrapper (232) can be included in the consuming application source code (240), and the source code (240) can invoke the wrapper (232) in a standard manner. A compiler (250) can compile the consuming application source code (240) and the consumable software component (205) in the consuming application executable code (260). For example, the consumable software component (205) may be included in a dynamically linked library that can be accessed by an executable file for the application. Alternatively, the software component (205) may be consumed in some other manner, such as by providing the software component (205) separately from the consuming application executable code, by including source code for the software component (205) in the consuming application source code (240), etc. Thus, the software component (205) may or may not be handled by a compiler (250) for the consuming application.

III. Examples of Exception-Based Component Model Generation and Consumption

Examples of exception-based component model generation and consumption will now be discussed. For example, consider a consumable software component with three functions: "MethodA", "Paint", and "GetBestMortgage". The software component may have a non-exception-based interface contract with the following code:

```
interface iFoo
{
    HRESULT MethodA        (default string** value1, string** value2);
    HRESULT Paint          (int color);
    HRESULT GetBestMortgage (int amount, Rate** bestRate,
                            string** bestBank);
}
```

This interface contract code indicates that MethodA will have a return type HRESULT. Accordingly, MethodA will return an HRESULT value, as discussed above. Additionally, the code hints at MethodA having two out arguments (as indicated by the "**" following the argument type) that are both string types: "value1" and "value2". A significance hint "default" is present for the out argument value1. The function Paint also has a return type HRESULT, but it does not include any out argument. Instead it includes one input argument, "color", which is an integer (int) type. The function GetBestMortgage also has a return type HRESULT. GetBestMortgage has one input argument, "amount", which is an integer type. GetBestMortgage also has two out arguments: "bestRate", which is an integer type; and "bestBank", which is a "Rate" type. To call one of these functions, input and/or out arguments would be defined, the function would be called while passing in the arguments, and the out arguments would later be read or inspected.

The non-exception-based interface contract above can be parsed, and a converter can generate the following exception-based wrapper code from the non-exception-based contract:

```
string MethodA(string** value2)
{
    string* value1;
    if (FAILED(IFoo->MethodA(&value1, value2)))
    {
        throw( );
    }
    return *value1;
}
void Paint(int color)
{
    If (FAILED(IFoo->Paint(color))
    {
        throw( );
    }
}
string GetBestMortgage(int amount, Rate** bestRate)
{
    string* bestBank;
    if (FAILED(IFoo->GetBestMortgage(amount, bestRate, &bestBank)))
    {
        throw( );
    }
    return *bestBank;
}
```

This code for the wrapper may be included in a header source file (e.g., a ".h" file), in a body source file (e.g., a ".CPP" file), split between header and body source files, or included in some other manner. For example, a wrapper may be implemented in a language that does not commonly split source code into header and body files (such as C# or JAVA). The code in the wrapper provides an exception-based interface contract implementation by including the code for throwing an exception if a function fails. Additionally, the exception-based interface contract implementation is a mirror equivalent of the non-exception-based interface contract information discussed above—having contract information that corresponds to the functions defined in the non-exception-based interface contract.

Exception-based functionality is invoked in the code above with the code "throw( )". For example, this "throw" function is invoked if the function "FAILED(IFoo→MethodA(&value1, value2)" returns a true value, or in other words if the HRESULT value from MethodA is something other than a one or a zero, indicating that MethodA has failed. Additionally, the wrapper returns "value1" for MethodA, even though value1 had been defined as an out argument for MethodA in the non-exception-based contract. The argument "value1" was chosen to be returned for MethodA because of the significance hint "default" for value1 in the non-exception-based contract. Accordingly, value1 will not need to be defined before MethodA is called, and value1 will not need to be inspected after MethodA returns. This is because the wrapper code defines value1 (with the line "string* value1"), and the wrapper code inspects and returns value1 (with the line "return *value1").

The function Paint has a return type "void" in the wrapper, indicating that Paint will not return a value. As discussed above, this can occur when a function, such as Paint, does not have any out arguments defined in the non-exception-based contract. However, the wrapper does include code to throw an exception if Paint fails.

The wrapper returns the argument "bestBank" for the function GetBestMortgage because there was no significance hint for the out arguments for the GetBestMortgage function, and "bestBank" was the last out argument listed for GetBestMortgage in the non-exception based interface contract. Some other type of heuristic may be used instead, such as choosing the first out argument, choosing the second out argument, etc. As can be seen, the wrapper also includes code to throw an exception if GetBestMortgage fails (the "if(FAILED . . . ) . . ." clause).

Another example will now be discussed to show how the use of exception-based models for consumable software components can decrease code that is entered by a developer of a consuming application to invoke consumable components. Consider the following code, which invokes non-exception-based models of functions to find all files in a folder and subfolder:

```
OS::IO::IStreamWriter* sw;
HRESULT hr = pIFile->CreateText(pPathToTmpFile, &sw);
if ( FAILED(hr) )
{
  goto error;
}
//--------------------------------------------------------------------
// Find all files in the folder and subfolder
//
hr = WriteNamesOfAllFilesFoundInFolder("C:\\temp", sw);
if ( FAILED(hr) )
{
  goto error;
}
//--------------------------------------------------------------------
// We can close the file now
sw->Close( );
```

As can be seen, this takes eight lines of code (not including separate lines for brackets): one for defining the argument "sw", one for invoking the CreateText function, one for invoking the WriteNamesOfAllFilesFoundInFolder function, one for closing a temporary file for "sw", and additional lines for error checking. If the called functions and their contracts are converted to exception-based models, as discussed above, then the code can be written using exception-based techniques as follows:

```
//--------------------------------------------------------------------
// Find all the files in the folder and subfolder
//
WriteNamesOfAllFilesFoundInFolder("C: \\temp",
File.CreateText(PathToTmpFile));
```

As can be seen, one line of code can be used with the exception-based models to invoke the same functionality that had taken six lines of code to invoke with the non-exception-based models. Additionally, the streamwriter variable "sw" did not need to be defined prior to passing it to another function because the exception-based contract implementation can include code to define and return "sw" (which had been an out argument of the CreateText function), as discussed above. Other changes in syntax may also be present, such as the "→" being replaced by a ".", and some other changes. As discussed above, the reduction in complexity and effort by a developer of a consuming application can occur because the converter is able to include much of this functionality in the wrapper itself, so that a developer does not need to write it out. The converter can do this by automatically parsing the non-exception-based contract and generating exception-based wrapper code, such as the code examples discussed above.

Accordingly, the tools and techniques described herein for generating exception-based component models from non-exception-based models can make it easier for consuming applications to consume software components.

IV. Techniques For Generating Exception-Based Component Models From Non-Exception-Based Models Several techniques will now be discussed for generating exception-based component models from non-exception-based models. Each of these techniques can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 3:
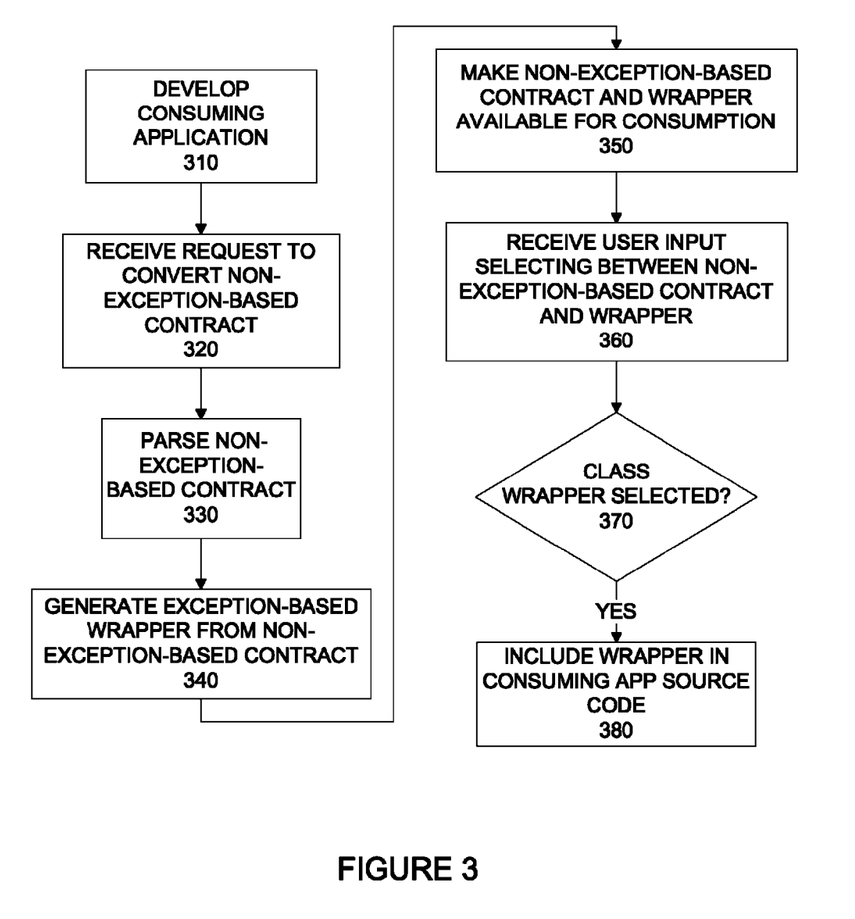
FIG. 3 is a flowchart illustrating a technique for generating exception-based component models from non-exception-based models.

Referring to FIG. 3, a technique for generating exception-based component models from non-exception-based models will be discussed. In the technique, a consuming software application can be developed (310). A request to convert a non-exception-based interface contract for exception-based consumption in the application can be received (320). The non-exception-based interface contract can be in a header file, such as a .h file. In response to the request, the non-exception-based interface contract for a consumable software component can be parsed (330). The non-exception-based interface contract and the consumable software component can include code for returning an error code. Parsing (330) can include parsing through interface contract information for a plurality of functions from the consumable software component, and the exception-based interface contract implementation can include corresponding exception-based interface contract information for each of the plurality of functions. Additionally, in response to the request that was received (320), a wrapper for the consumable software component can be generated (340) from the non-exception-based interface contract. The wrapper can have an exception-based interface contract implementation, which can be a mirror equivalent of the non-exception-based interface contract. For each function referenced in the non-exception-based interface contract with a hint as to one or more out arguments, the wrapper can include code for returning one of those argument(s) from the function.

The technique of FIG. 3 can also include making (350) the non-exception-based interface contract and the wrapper available for consumption in the consuming application. User input selecting between the non-exception-based interface contract and the wrapper can be received (360). If it is determined (370) that the wrapper was selected, the wrapper can be included (380) in source code for the consuming application.

Figure 4:
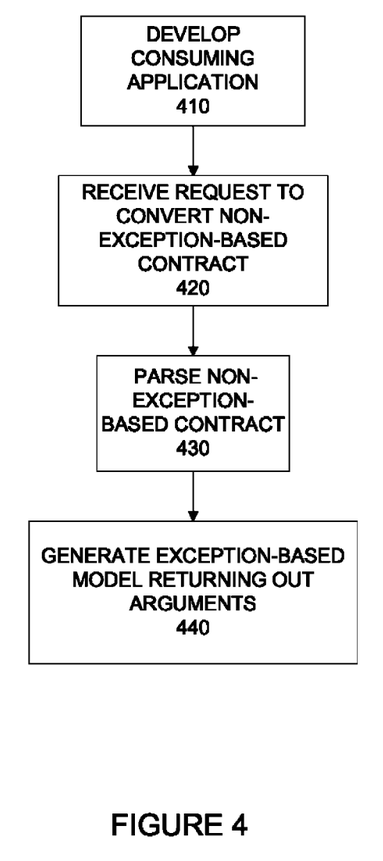
FIG. 4 is another flowchart illustrating a technique for generating exception-based component models from non-exception-based models.

Referring now to FIG. 4, another technique for generating exception-based component models from non-exception-based models will be discussed. The technique can include developing (410) a consuming application. While developing (410) the consuming application, the technique can include receiving (420) a request to convert a non-exception-based interface contract for exception-based consumption in the application. In response to the request, the technique can include parsing (430) a non-exception-based interface contract for a consumable software component. The non-exception-based interface contract and the consumable software component can include code for returning an error code from the consumable software component. Additionally, in response to the request that was received (420), an exception-based model for the consumable software component can be generated (440) from the non-exception-based interface contract. If the non-exception-based interface contract hints at one or more out arguments for a function in the consumable software component, then generating (440) can include generating, in the exception-based model, code for returning one of the hinted-at argument(s) from the function.

The non-exception-based interface contract, the exception-based model, and/or the consumable software component can be native code (i.e., non-managed code). Also, the exception-based model can include a wrapper having an exception-based interface contract implementation that is a mirror equivalent of the non-exception-based interface contract. If the non-exception-based interface contract hints at a plurality of out arguments for the function in the consumable software component, then the technique can further include using predefined heuristics to select one of the plurality of hinted-at arguments as a return value for the function, and generating (440) can include generating, in the exception-based model, code for returning the selected argument from the function. The technique can also include receiving user input pertaining to one or more selection heuristics, and selecting one of the plurality of out arguments as a return value for the function can be done according to the user input, such as by applying the one or more selection heuristics according to the user input. Additionally, generating (440) can include generating, in the exception-based model, code for hinting at one or more arguments from the plurality of hinted-at arguments for the function as out arguments in the exception-based model.

Figure 5:
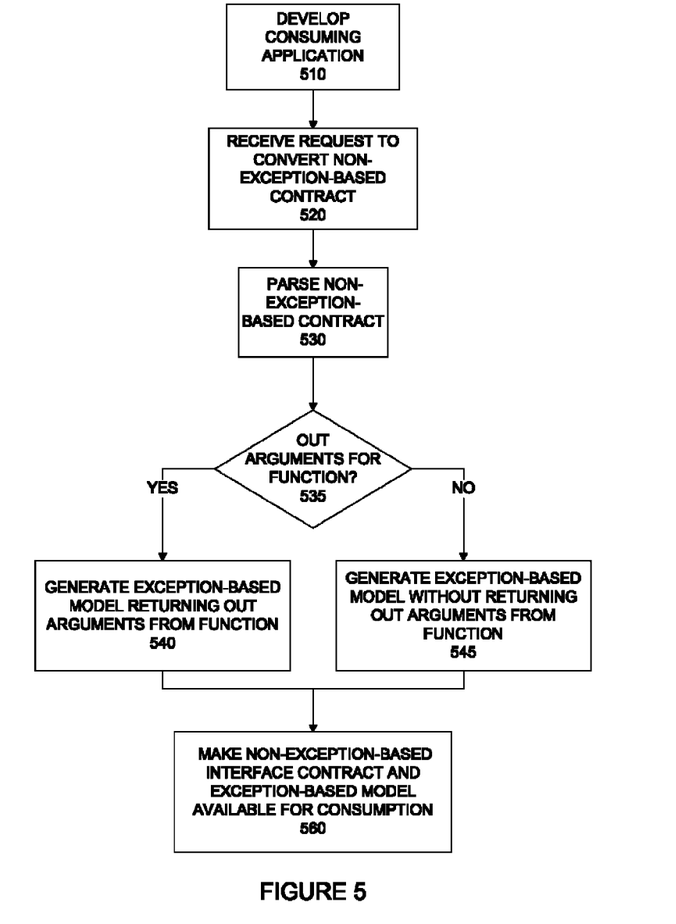
FIG. 5 is yet another flowchart illustrating a technique for generating exception-based component models from non-exception-based models.

Referring now to FIG. 5, yet another technique for generating exception-based component models from non-exception-based models will be discussed. The technique can include developing (510) a consuming application. While developing (510) the application, the technique can include receiving (520) a request to convert a non-exception-based interface contract for exception-based consumption in the application. In response to the request, a non-exception-based interface contract for a consumable software component can be parsed (530). Also in response to the request, it can be determined (535) whether the non-exception-based interface contract includes one or more arguments that are hinted at as out argument(s) for a function in the consumable software component. An exception-based model for the consumable software component can be generated from the non-exception-based interface contract, and the exception-based model can include an exception-based interface contract implementation. If it is determined (535) that the non-exception-based interface contract includes code hinting at one or more arguments for the function as out arguments, then generating (540) the exception-based model can comprise including, in the exception-based model, code for returning one of those hinted-at arguments from the function. If it is determined (535) that the non-exception-based interface contract does not hint at one or more arguments for the function as out arguments, then generating (545) the exception-based model can be done without including, in the exception-based model, code for returning one of the hinted-at arguments from the function. Additionally, the technique can include making (560) the non-exception-based interface contract and the exception-based model available for consumption by a consuming application. Accordingly, a consuming application may consume one or the other, neither, or both of the contract and the model.

The non-exception-based interface contract and the consumable software component can include code for returning an error code. Additionally, the exception-based model can include a wrapper having an exception-based interface contract implementation that is a minor equivalent of the non-exception-based interface contract.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I/We claim:

1. A computer-implemented method, comprising:
   parsing a non-exception-based interface contract for a consumable software component; and
   generating a wrapper for the consumable software component from the non-exception-based interface contract, the wrapper having an exception-based interface contract implementation, and the exception-based interface contract implementation being a mirror equivalent of the non-exception-based interface contract.

2. The method of claim 1, wherein the non-exception-based interface contract is in a header file.

3. The method of claim 1, further comprising making the non-exception-based interface contract and the wrapper available for consumption in a consuming application.

4. The method of claim 3, further comprising receiving user input selecting between the non-exception-based interface contract and the wrapper.

5. The method of claim 1, further comprising developing a consuming application and receiving a request to convert the non-exception-based interface contract for exception-based consumption in the application, wherein the parsing and generating are performed in response to the request.

6. The method of claim 1, further comprising including the wrapper in source code for a consuming application.

7. The method of claim 1, wherein parsing comprises parsing through interface contract information for a plurality of functions from the consumable software component, and wherein the exception-based interface contract implementation comprises corresponding exception-based interface contract information for each of the plurality of functions.

8. The method of claim 1, wherein for each function referenced in the non-exception-based interface contract with one or more hints to one or more arguments being out arguments, the wrapper comprises code for returning one of the one or more hinted-at arguments from the function.

9. The method of claim 1, wherein
the method further comprises:
  developing a consuming application and receiving a request to convert the non-exception-based interface contract for exception-based consumption in the application;
  making the non-exception-based interface contract and the wrapper available for consumption in the application;
  receiving user input selecting between the non-exception-based user interface contract and the wrapper for inclusion in the consuming application;
  if the user input selects the wrapper, then including the wrapper in source code for the consuming application;
the non-exception-based interface contract is included in a header file;
the parsing and generating are performed in response to the request;
parsing comprises parsing through interface contract information for a plurality of functions in the consumable software component;
the exception-based interface contract implementation comprises corresponding exception-based interface contract information for each of the plurality of functions;
for each of the plurality of functions in the non-exception-based interface contract with one or more hints at one or more arguments being out arguments, the wrapper comprises instructions for returning one of the one or more hinted-at arguments from the function; and
the non-exception-based interface contract and the consumable software component include code for returning an error code.

10. A computer system comprising:
at least one processor; and
a memory comprising instructions stored thereon that when executed by the at least one processor cause the at least one processor to perform acts comprising:
  parsing a non-exception-based interface contract for a consumable software component; and
  generating an exception-based model for the consumable software component from the non-exception-based interface contract, such that if the non-exception-based interface contract hints at one or more arguments as being one or more out arguments for a function in the consumable software component, then generating comprises generating, in the exception-based model, code for returning one of the one or more hinted-at arguments from the function.

11. The computer system of claim 10, wherein the non-exception-based interface contract, the exception-based model, and the consumable software component are native code.

12. The computer system of claim 10, wherein the exception-based model comprises a wrapper having an exception-based interface contract implementation that is a mirror equivalent of the non-exception-based interface contract.

13. The computer system of claim 10, wherein if the non-exception-based interface contract hints at a plurality of arguments as being out arguments for the function in the consumable software component, then the acts further comprise using predefined heuristics to select one of the plurality of hinted-at arguments as a return value for the function, and wherein generating comprises generating, in the exception-based model, code for returning the selected hinted-at argument from the function.

14. The computer system of claim 13, wherein generating comprises generating, in the exception-based model, code for hinting at one or more arguments from the plurality of hinted-at arguments for the function as out arguments in the exception-based model.

15. The computer system of claim 13, wherein the acts further comprise receiving user input pertaining to one or more selection heuristics, and wherein selecting one of the plurality of out arguments as a return value for the function is done according to the user input.

16. The computer system of claim 10, wherein the acts further comprise:
  developing a consuming application; and
  while developing the consuming application, receiving a request to convert the non-exception-based interface contract for exception-based consumption in the application, wherein the parsing and generating are performed in response to the request.

17. Computer-readable storage hardware having computer-executable instructions embodied thereon that, when executed by at least one processor, cause the at least one processor to perform acts comprising:
  parsing a non-exception-based interface contract for a consumable software component;
  determining whether the non-exception-based interface contract includes code hinting at one or more arguments as out arguments for a function in the consumable software component;
  generating an exception-based model for the consumable software component from the non-exception-based interface contract, the exception-based model comprising an exception-based interface contract implementation, such that if the non-exception-based interface contract includes code hinting at one or more arguments as out arguments for the function, then generating the exception-based model comprises including, in the exception-based model, code for returning one of the hinted-at arguments from the function; and
  making the non-exception-based interface contract and the exception-based model available for consumption by a consuming application.

18. The computer-readable storage hardware of claim 17, wherein the exception-based model comprises a wrapper having an exception-based interface contract implementation that is a mirror equivalent of the non-exception-based interface contract.

19. The computer-readable storage hardware of claim 17, wherein the non-exception-based interface contract and the consumable software component include code for returning an error code.

20. The computer-readable storage hardware of claim 17, wherein the acts further comprise:
  developing the consuming application; and while developing the consuming application, receiving a request to convert the non-exception-based interface contract for exception-based consumption in the application, wherein the parsing, determining, and generating are performed in response to the request.

* * * * *